United States Patent [19]

Maresca et al.

[11] Patent Number: 4,912,192

[45] Date of Patent: Mar. 27, 1990

[54] POLYARYLNITRILE POLYMERS AND A METHOD FOR THEIR PRODUCTION

[75] Inventors: Louis M. Maresca, Belle Mead; Alford G. Farnham, Mendham; Thomas H. Schwab, North Brunswick; Ulrich A. Steiner, North Plainfield, all of N.J.

[73] Assignee: Amoco Corporation, Chicago, Ill.

[21] Appl. No.: 758,561

[22] Filed: Jul. 23, 1985

Related U.S. Application Data

[63] Continuation of Ser. No. 480,737, Mar. 31, 1983, abandoned.

[51] Int. Cl.$^4$ ............................................. C08G 65/40
[52] U.S. Cl. .................................. 528/176; 528/191; 528/211; 528/185
[58] Field of Search ............... 528/176, 191, 211, 185

[56] References Cited

U.S. PATENT DOCUMENTS

| | | | |
|---|---|---|---|
| 3,591,558 | 7/1971 | Brown et al. | 528/191 |
| 3,730,946 | 5/1973 | Heath et al. | 524/31 |
| 4,042,567 | 8/1977 | Sundermann | 528/211 |
| 4,049,630 | 9/1977 | Sundermann et al. | 528/211 |
| 4,108,837 | 8/1978 | Johnson et al. | 528/211 |

*Primary Examiner*—John Kight
*Assistant Examiner*—S. A. Acquah
*Attorney, Agent, or Firm*—William H. Magidson; Ralph C. Medhurst

[57] ABSTRACT

Described herein are novel crystalline polyarylnitrile polymers which have excellent mechanical and thermal properties. Also, described is a process for producing such polyarylnitrile polymers.

4 Claims, No Drawings

POLYARYLNITRILE POLYMERS AND A METHOD FOR THEIR PRODUCTION

This application is a continuation of prior U.S. Application Ser. No. 480,737 filed Mar. 31, 1983, now abandoned.

BACKGROUND OF THE INVENTION

This invention is directed to novel crystalline polyarylnitrile polymers and a process for their production.

A poly(arylether ketone) having the following formula:

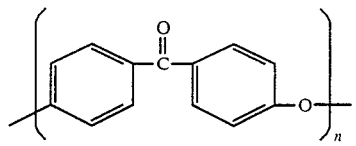

is well known in the prior art. It is a crystalline polymer having excellent mechanical and thermal properties. It is useful for coating wire and cable and can be molded into products such as electrical connectors of superior performance.

However, the poly(arylether ketone) is prepared by the following procedure:

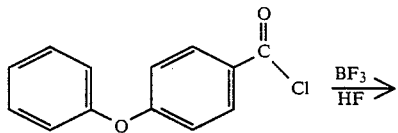

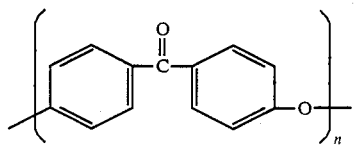

Thus, the preparation of the poly(arylether ketone) is not only difficult, but also requires the use of hydrofluoric acid as solvent and boron trifluoride as catalyst which are poisonous, detrimental to the environment and otherwise hazardous to work with.

Attempts have been made to develop other methods of synthesizing the poly(arylether ketone) without the use of hydrofluoric acid, or alternatively, to develop other polymers with properties comparable to those of this poly(arylether ketone).

U.S. Pat. No. 3,730,946 is directed to particular amorphous cyanoaryloxy polymers prepared from the reaction of a dinitrobenzene containing a cyano group, directly attached to the benzene nucleus, with an alkali metal salt of a divalent carbocyclic aromatic radical in the presence of a dipolar aprotic solvent. The cyanoaryloxy polymers of U.S. Pat. No. 3,730,946 are described as containing the following repeating unit:

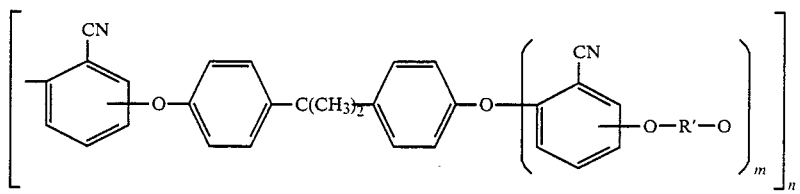

These copolymers are not crystalline and do not have very high molecular weight. The polyarylnitrile of formula (I) below was never prepared in U.S. Pat. No. 3,730,946.

It has been found that the polyarylnitriles of this invention are crystalline high molecular weight polymers which have excellent mechanical and thermal properties and are comparable in performance to the poly(arylether ketone) described above. Further, these polyarylnitrile polymers are easily prepared as compared to the poly(arylether ketone).

THE INVENTION

This invention is directed to crystalline high molecular weight polyarylnitrile polymers and a process for the production thereof.

The polyarylnitrile polymers of this invention are of the following formula:

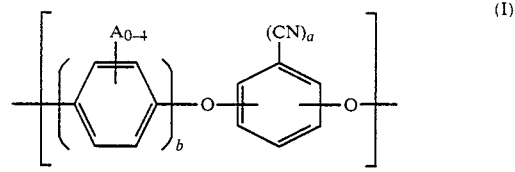

wherein A is independently selected from hydrogen, alkyl of 1 to 4 carbon atoms, alkoxy of 1 to 4 carbon atoms and halogen; a is an integer of 1 or 2 and b is an integer of 1 to 3.

The polyarylnitrile polymer has a reduced viscosity of about 0.3, preferably of about 0.8 and most preferably greater than about 1.3 dl/gm as measured in p-chlorophenol at 50° C.

The polyarylnitrile polymers of this invention are prepared by first forming an oligomer at a moderate temperature and then advancing the oligomer to a high molecular weight polymer at elevated temperatures. If the high molecular weight polymer is soluble in the solvent at the lower temperature then the second step of the polymerization can be carried out at this temperature. Specifically, the process of this invention comprises the following steps:

(a) reacting substantially equimolar amounts of a dihydroxy compound of the formula:

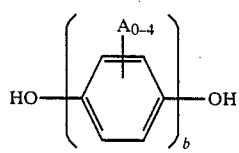

wherein A and b are defined above, with a substantially equimolar amount of a compound of the formula:

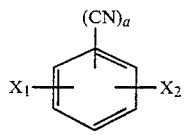

wherein the X's are independently selected from Cl, F, Br or NO$_2$, preferably, both X's are Cl;

and an alkali metal carbonate in a solvent mixture comprising a solvent which forms an azeotrope with water and a dipolar aprotic solvent at a temperature of less than 200° C., while continuously removing water from the reaction mass as an azeotrope with an azeotrope forming solvent to maintain the reaction at substantially anhydrous conditions to form an oligomer;

(b) heating said oligomer at a temperature greater than 200° C. for a period of time sufficient to form a polyarylene polymer having a reduced viscosity of greater than about 0.3 dl/gm.

The reaction is carried out in an inert atmosphere, e.g., nitrogen, at atmospheric pressure, although higher or lower pressures may be used.

The polymer is then recovered by conventional techniques such as coagulation, solidification, granulation, leaching extraction, solvent evaporation, and the like.

The solvent mixture comprises a solvent which forms an azeotrope with water and a dipolar aprotic solvent. The solvent which forms an azeotrope with water includes an aromatic hydrocarbon such as benzene, toluene, xylene, ethylbenzene, chlorobenzene, dichlorobenzene, and the like.

The dipolar aprotic solvent employed are those generally known in the art for the manufacture of polyarylether sulfones and include sulfur containing solvents such as those of the formula:

in which each R$_1$ represents a monovalent lower hydrocarbon group free of aliphatic unsaturation, and preferably contains less than about 8 carbon atoms or when connected together represents a divalent alkylene group with d being an integer of from 1 to 2 inclusive. Thus, in all of these solvents all oxygens and two carbon atoms are bonded directly to the sulfur atom. Thus, contemplated for use in this invention are such solvents as those having the formula:

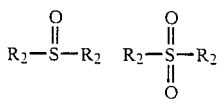

where the R$_2$ groups are independently lower alkyl, such as methyl, ethyl, propyl, butyl, and the like groups, and aryl groups such as phenyl and alkylphenyl groups as well as those wherein the R$_2$ groups are interconnected as in a divalent alkylene bridge such as

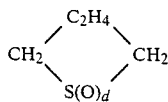

in thiophene oxides and dioxides. Specifically, these solvents include dimethylsulfoxide, dimethylsulfone, diphenylsulfone, diethylsulfoxide, diethylsulfone, diisopropylsulfone, tetrahydrothiophene 1,1-dioxide (commonly called tetramethylene sulfone or sulfolane) and tetrahydrothiophene-1 monoxide.

Additionally, nitrogen containing solvents may be used. These include dimethyl acetamide, dimethyl formamide, and N-alkylpyrrolidinone such as N-methylpyrrolidinone.

Other solvents such as benzophenone and tetra substituted ureas may also be used.

The azeotrope forming solvent and polar aprotic solvent are used in a weight ratio of from about 1:10 to about 1:1, preferably from about 1:6 to about 1:4.

In the reaction, the hydroxy containing compound is slowly converted, in situ, to the alkali salt thereof by reacting with the alkali metal carbonate or a mixture of carbonates. The alkali metal carbonate is preferably potassium carbonate or a mixture of sodium carbonate and potassium carbonate.

Water is continuously removed from the reaction mass as an azeotrope with the azeotrope forming solvent so that substantially anhydrous conditions are maintained.

It is essential in the polymerization reaction that the solvent be maintained substantially anhydrous during the reaction. While amounts of water up to about one percent can be tolerated, and are somewhat beneficial when employed with fluorinated dihalobenzenoid compounds, amounts of water substantially greater than this are desirably avoided as the reaction of water with the halo and/or nitro compound leads to formation of phenolic species and only low molecular weight products are secured. Consequently, in order to secure the high polymers, the system should be substantially anydrous, and preferably contain less than 0.5 percent by weight water during the reaction.

The molecular weight may be controlled during the reaction by the use of a monofunctional phenol chain terminator such as p-phenylphenol, phenol, t-butylphenol, and the like.

Preferably, after the desired molecular weight has been attained, the polymer is treated with an activated aromatic halide or an aliphatic halide such as methyl chloride or benzyl chloride, and the like. Such treatment of the polymer converts the hydroxyl end groups into ether groups which stabilize the polymer. The polymer so treated has good melt and oxidative stability.

The preferred starting materials are either biphenol or hydroquinone and 2,6-dichlorobenzonitrile.

EXAMPLES

The following examples serve to give specific illustrations of the practice of this invention but they are not intended in any way to limit the scope of this invention. In these examples, all parts and percentages are on a weight basis unless otherwise specified.

EXAMPLE 1

A four neck, 2 liter reactor was equipped with a mechanical stirrer, thermometer, dropping funnel, dry nitrogen inlet and vacuum jacketed vigaux column with Dean-Stark trap and condenser. Into the reactor was charged with 173.73 gm (1.01 moles) of 2,6-dichlorobenzonitrile (hereinafter DCBN), 110.11 gm (1.00 moles) of hydroquinone (hereinafter HQ), 3.40 gm (0.02 moles) of p-phenylphenol, 165.85 gm (1.20 moles) of anhydrous potassium carbonate, 200 ml of toluene and 978 ml of sulfolane. The mixture was purged with nitrogen for one hour at room temperature (about 25° C.) and then heated to reflux (160° C.). Above 130° C. carbon dioxide was readily evolved from the potassium carbonate-phenol reaction. After one hour at 160° C., the pre-reaction of DCBN with HQ was complete and the temperature was then increased to 225° C. by removing water and toluene through the Dean-Stark trap. Fresh toluene was thereafter added dropwise into the reactor for the remainder of the reaction to insure continuous dehydration. After 1½ hours, methyl chloride was bubbled through the now viscous solution for 30 minutes, to achieve end group capping. The reaction product was allowed to cool and solidify. After pulverizing the solid product in a Waring blender, the material was washed several times with distilled water. The final wash was acidified with oxalic acid to a pH of 2. The polymer was collected and dried in a vacuum oven at 200° C. A theoretical yield of the polymer was obtained which had a reduced viscosity of 1.49 in p-chlorophenol at 50° C. The polymer had repeating units of the following formula:

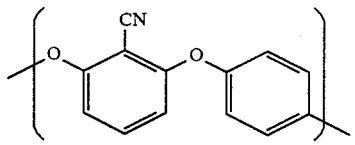

EXAMPLES 2 TO 7

Utilizing the procedure described in Example 1, polyarylene of various molecular weights was produced by adjusting, simultaneously, the concentration of DCBN and p-phenylphenol. The results are summarized in Table I.

TABLE I
CORRELATION OF REDUCED VISCOSITY WITH TERMINATOR STOICHIOMETRY

| Example | Moles of DCBN | Moles of p-phenylphenol ($\times 10^2$) | R.V.[1] |
|---|---|---|---|
| 2 | 1.0025 | 0.5 | 3.50 |
| 3 | 1.005 | 1.0 | 2.30 |
| 4 | 1.0067 | 1.35 | 1.95 |
| 5 | 1.01 | 2.0 | 1.49 |
| 6 | 1.02 | 4.0 | 0.94 |
| 7 | 1.03 | 6.0 | 0.74 |

[1] R.V. = reduced viscosity in p-chlorophenol at 50° C.

EXAMPLE 8

A mixture of 18.62 g (0.100 moles) of biphenol, 17.37 g (0.101 moles) of 2,6-dichlorobenzonitrile, 16.60 g (0.120 moles) of potassium carbonate, 0.34 g (0.002 moles) of p-phenylphenol and 75 ml of toluene was purged with nitrogen and then heated to reflux. A 150 ml of N,N dimethyl acetamide was added slowly. The temperature of the reaction was increased to 160° C. by removing toluene. After two hours at 160° C. the temperature was lowered to 145° C. and the polymerization was terminated with methyl chloride. The reaction mixture was ground and extracted twice with methanol and twice with hot water. The resulting polymer was dried in a vacuum oven. It had a reduced viscosity (0.2 g in 100 ml of N-methyl pyrrolidinone) of 1.49 dl/g. The properties of the polymer are shown in Table II.

The polymer produced in Examples 1 and 8 and a poly(arylether ketone) identified as Stilan 1000 (obtained from Raychem Corporation and hereinafter identified as Control) were molded into ASTM test specimens and tested for the following properties: tensile modulus and strength according to ASTM D-638; yield elongation according to ASTM D-638; elongation at break according to ASTM D-368; pendulum impact strength according to ASTM D-1822. Also, the glass transition temperature and melting temperature were measured according to the procedure of A. Brown, "Second Order Transition Temperature and Fibre Properties," Textile Research Journal, 25, 891 (1955).

The results are shown in Table II.

TABLE II

| | Control | Example 1 | Example 8 |
|---|---|---|---|
| % Secant modulus (psi) | 373,000 | 315,000 | 287,000 |
| Tensile strength (psi) | 12,000 | 14,100 | 14,500 |
| Elongation (%) | 31 | 18 | 39 |
| Pendulum impact strength (ft-lbs/in$^3$) | 123 | 121 | >337 |
| Tg (° C.) | 165 | 175 | 195 |
| Tm (° C.) | 370 | 380 | 350 |

COMPARATIVE EXAMPLE A

Example 1 was repeated except the temperature of the reaction was maintained at approximately 160° C. The polymerization was prematurely terminated by precipitation of the crystalline polymer.

EXAMPLE 9

A 50 gallon Dowtherm glass-lined reactor was equipped with a 6-inch (internal diameter)×5 foot long packed distillation column, condenser and a decanter for separating water from the azeotrope agent.

The following materials were charged to the reactor:

| | pound-moles | pounds |
|---|---|---|
| hydroquinone | 0.177 | 19.5 |
| 2,6-dichlorobenzonitrile | 0.178 | 30.9 |
| potassium carbonate (35 mesh) | 0.2125 | 29.3 |
| p-phenylphenol | 0.0018 | 0.30 |
| sulfolane | — | 212.3 |
| toluene | — | 24.4 |

The contents of the reactor were heated to 165° C. and held there for one hour to conduct the pre-reaction step. The materials were heated to 225 to 235° C. over a period of 45 minutes and held there for two hours to conduct the final polymerization. During both steps, water was continuously removed from the reaction mixture with toluene azeotrope agent which recycled from the decanter to the top of the reactor distillation column. After one hour at reaction temperature, a sample was taken and the reduced viscosity measured. The reduced viscosity was 1.44 dl/g as measured in p-chlorophenol at 50° C. The reaction was terminated after the two hour period by sparging methyl chloride through the reaction mixture for one hour. The reaction product was allowed to cool and solidify. After pulverizing the solid product in a hot melt granulator, the material was washed several times with distilled water. The final wash was acidified with oxalic acid to a pH of 2. The polymer was collected and dried in a vacuum oven at 200° C. A theoretical yield of the polymer was obtained (37.3 lbs) which had a reduced viscosity of 1.71 in p-chlorophenol at 50° C.

What is claimed is:

1. A process for preparing a crystalline polyarylnitrile polymer having repeating units of the following formula:

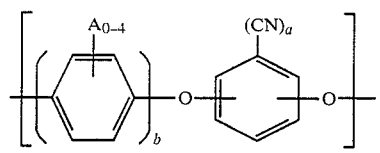

where A is independently selected from hydrogen, alkyl of 1 to 4 carbon atoms, alkoxy of 1 to 4 carbon atoms and halogen, a is an integer of 1 or 2 and b is an integer of 1 to 3 and wherein the polyarylnitrile polymer has a reduced viscosity of at least 0.3 dl/g as measured in p-chlorophenol at 50° C., which comprises the following step:

(a) reacting substantially equimolar amounts of a dihydroxy compound of the formula:

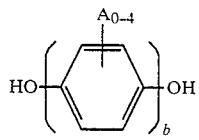

wherein A and b are as defined above, with a substantially equimolar amount of a benzonitrile compound of the formula:

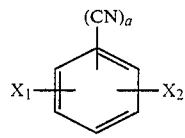

wherein a is as defined above, and the X's are independently selected from Cl, F, Br or NO₂, and an alkali metal carbonate in a solvent mixture comprising a solvent which forms an azeotrope with water and a dipolar aprotic solvent at a temperature less than 200° C., while continuously removing water from the reaction mass as an azeotrope with an azeotrope forming solvent to maintain the reaction at substantially anhydrous conditions to form an oligomer;

(b) heating said oligomer at a temperature greater than 200° C. for a period of time sufficient to form a polyarylnitrile polymer having a reduced viscosity of greater than about 0.3 dl/gm.

2. A process as defined in claim 1 wherein the dihydroxy compound is of the formula:

3. A process as defined in claim 1 wherein the the dihydroxy compound is of the formula:

4. A process as defined in claim 1 wherein the benzontrile is of the following formula:

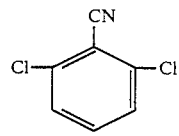

* * * * *